March 31, 1964

J. A. HARDMAN 3,126,991

CONTROL MEANS INCLUDING PIVOT CONTROL FOR
POWER SELECTORS OF TRACK LAYING VEHICLES

Filed March 12, 1962

INVENTOR.
JAMES A. HARDMAN
BY M. Ralph Shaffer
HIS ATTORNEY

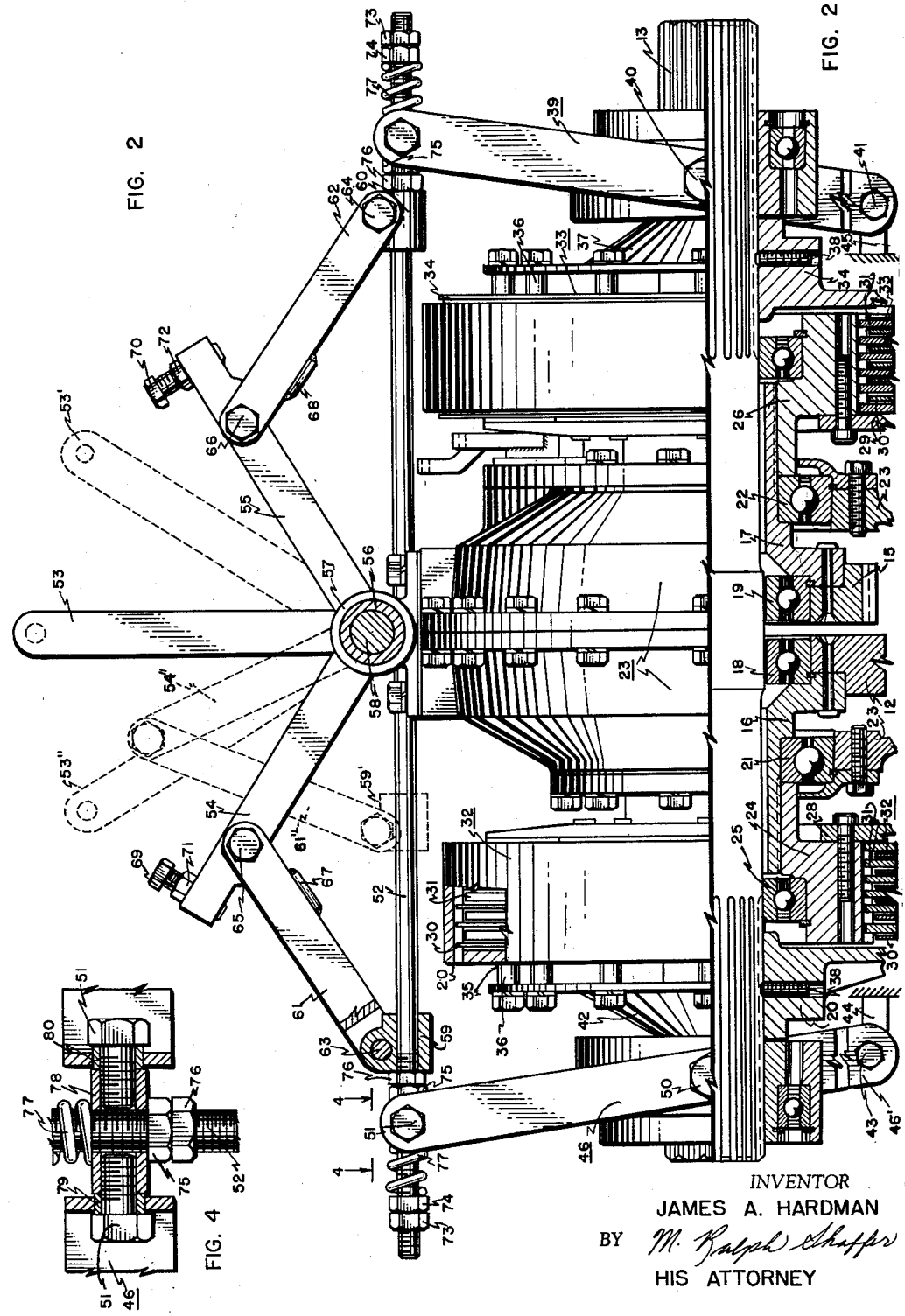

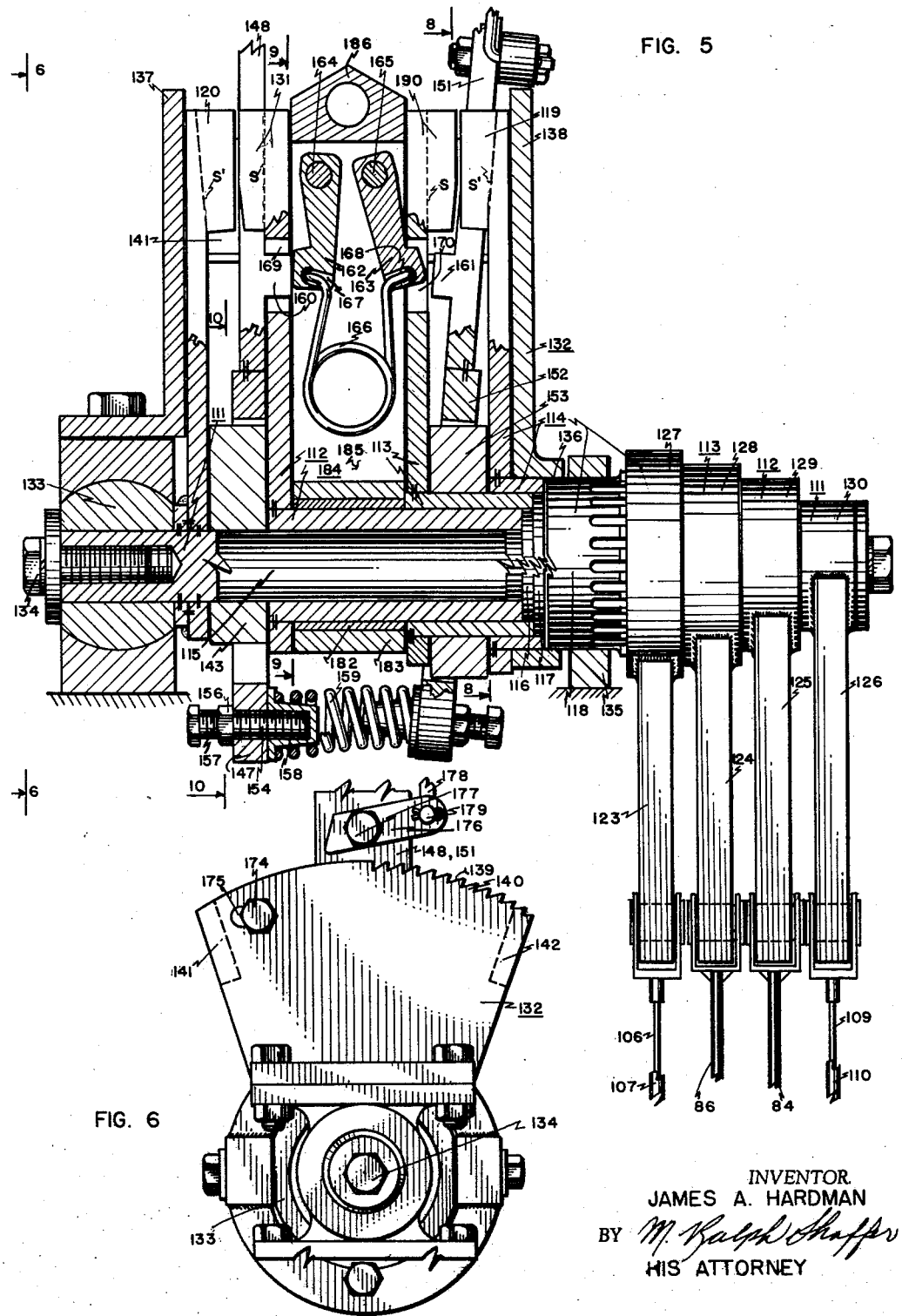

March 31, 1964 J. A. HARDMAN 3,126,991
CONTROL MEANS INCLUDING PIVOT CONTROL FOR
POWER SELECTORS OF TRACK LAYING VEHICLES
Filed March 12, 1962 4 Sheets-Sheet 4

INVENTOR.
JAMES A. HARDMAN
BY *M. Ralph Shaffer*
HIS ATTORNEY

United States Patent Office 3,126,991
Patented Mar. 31, 1964

3,126,991
CONTROL MEANS INCLUDING PIVOT CONTROL FOR POWER SELECTORS OF TRACK LAYING VEHICLES
James A. Hardman, Logan, Utah, assignor to Utah Scientific Research Foundation, a corporation of Utah
Filed Mar. 12, 1962, Ser. No. 179,144
6 Claims. (Cl. 192—4)

The present invention relates to control means for power selectors of track laying vehicles and, more particularly, to a new and improved control means, permissively including pivot control, for actuating the power selectors of track laying vehicles in a positive, reliable and versatile manner.

In the past many types of power selectors, and control means therefor, have been devised for employment in track laying vehicles. Such power selectors generally include a single input drive and plural output drives for supplying power to the sprockets of the two tracks disposed on opposite sides of the vehicle. By patent applications filed in the United States Patents Office, for example, those entitled, "Drive Mechanism for Track Laying Vehicles, Serial Nos. 784,240" (now Patent No. 3,044,318), and 121,670, filed December 31, 1958 and July 3, 1961, respectively, I have disclosed a number of power selector constructions incorporating single power inputs and plural power outputs with one or more clutches and gear means associated with each output and with braking means supplied each output. Both halves of these power selectors have the advantage of being actuated at both sides thereof in a rectilinear, simultaneous, plural conditioning manner so as to simplify linkage, lever systems, et cetera.

A principal object of the present invention is to provide control means for rectilinearly operable power selectors wherein all operations of the power selector may be accomplished by simple two-lever control in such a manner that external equipment such as foot brakes, for example, need not be employed.

A further object of the invention is to provide control means for the power selectors of track laying vehicles wherein both clutch and brake control for an output of the power selector may be effectuated by the manipulation of a single lever, even though the respective half of the power selector associated with this output incorporates plural clutch and braking means.

A further object of the present invention is to incorporate in such control means the principle of infinite leverage for retentively locking selected clutch engagements, thereby enabling the operator to accomplish clutch engagement and the setting thereof in a very easy manner, even in the case of the use of fairly heavy equipment.

A further object of the present invention is to provide control means for a rectilinearly controlled power selector wherein positive clutch disengagement is assured when the braking means is applied.

A further object of the present invention is to provide control means, including pivot control means, for the power selector of a track-laying vehicle so constructed that, when pivot control is to be applied it can be accomplished by an easy locking of the two lever systems of the control means in their intended positions, regardless of the desired speed range available.

Another object of the present invention is to provide suitable control means for a clutch-brake power selector wherein a simple outward movement of the control levers across central positions in the control insure engagement with the lever follower of the brake, and the appropriate movement thereof, while simultaneously locking the clutches in neutral.

A further object of the invention is to provide complete adjustment means for the control mechanism of the power selector so that "central lever position" may be adjusted as required by existing factors.

A further object of the present invention is to provide, in control means for a power selector, plural, coaxially aligned, concentric bell crank constructions, the design of which will provide complete control for the power selector from any desired operator location on the vehicle.

The features of the present invention which are believed to be novel are set forth with particularity in the appended claims. The present invention, both as to its organization and manner of operation, together with further the objects and advantages thereof, may best be understood by reference to the following description, taken in connection with the accompanying drawings in which:

FIGURE 2 is a side elevation take along the line 2—2 in FIGURE 1, enlarged in scale, broken away and partially sectioned for purposes of convenience of illustration, and showing a representative half of the power selector with a connected portion of the control means therefor.

FIGURE 4 is an enlarged, fragmentary, view taken along the line 4—4 in FIGURE 2.

FIGURE 5 is an enlarged elevation, principally in section, of that portion of the control means controlling the power selector of FIGURES 1 and 2 immediately associated with the power selector manually operable shifting levers; this figure shows in fragmentary view the coupling of the tie rods and brake cables which are illustrated in fragmentary view in FIGURE 1.

FIGURE 6 is an end elevation taken along the lines 6—6 in FIGURE 5, reduced in scale, and shown partially in fragmentary view for convenience of illustration; FIGURE 6 illustrates, principally, the locking engagement means of a representative shifting lever with an associated portion of the structure.

FIGURE 8 illustrates the engagement of and coaction with a lever follower by its associated shifting lever.

Figure 1:
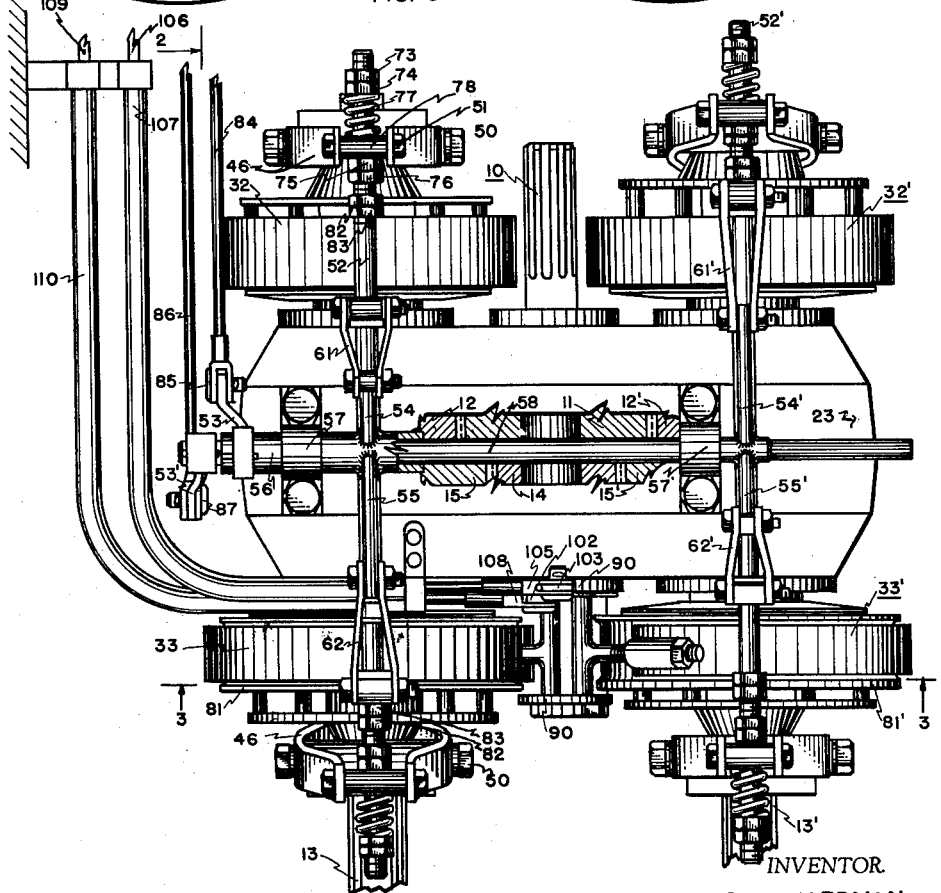
FIGURE 1 is a plan view of a power selector of the present invention including a connected portion of the control means therefor.

In FIGURES 1 and 2 input shaft 10 is adapted for coupling to a power source and has fixedly keyed thereto a drive gear 11 which meshes with driven gears 12 and 12', both of the latter being respectively journalled upon output shafts 13 and 13'. Likewise fixedly secured to input shaft 10 is a second drive gear 14, of different size than drive gear 11, which meshes with driven gears 15 and 15', both of the latter being respectively journalled upon respective output shafts 13 and 13' in a manner hereinafter described. Since both sides of the power selector system shown, i.e. the halves on both sides of input shaft 10 in FIGURE 1, are identical, only one of the sides shall be shown and described in detail, as at the bottom of FIGURE 2, for example, and the remaining half will simply be given prime numbers.

Driven gears 12 and 15 are respectively pinned to their sleeve extensions 16 and 17 as shown. Carrier bearings 18 and 19 respectively journal the gears 12 and 15 to shaft 13. Bearings 21 and 22 journal the respective sleeves 16 and 17 within gear housing 23. Clutch spider 24 is splined onto its respective sleeve 16 and is carried on shaft 13 by bearing 25. Correspondingly, clutch spider 26 is splined upon sleeve 17 and is carried by bearing 27 on the output shaft 13. Both of the clutch spiders 24 and 26 carry reaction plates 28 and 29 for clutch disc pluralities 30 and 31 (one plurality for each clutch 32 and 33). Both of the respective clutches 32 and 33 are fabricated in the same manner, and so only one will be described. Each clutch includes a respective clutch drum 34 and 20 to which is keyed, for translational movement therewithin, the respective pluralities of clutch discs 30. Correspondingly, clutch discs 31 will be keyed for translational movement to the clutch spiders 24 and 26. The clutch discs are of standard construction, with the outer discs 30 being preferably steel plates and the inner discs 31 comprising fiber plates of suitable construction.

It will be noted that each of the clutch drums 20 and 34 include a plurality of mutually spaced, radially oriented apertures 35 which provide admittance for clutch disc compression fingers 36. These fingers may be made up of sleeves and cap screws threaded therein, for example, and secured to clutch pressure plates 37 and 42, both of the latter being splined upon output shaft 13. By means such as a set screw 38, the clutch drums 20 and 34, in addition to being splined onto output shaft 13, are further affixed in place. The yokes 46 and 39 are preferably pivotally secured by pivot means 41 and 43 to structures 44 and 45, both of which are fixedly disposed relative to housing 23. Accordingly, it will be noted that the inward movement of yoke 39, for example, since the latter is securely affixed by pivot means 40 to pressure plate 37, will translate the fingers 36 of clutch 33 in apertures 35 so as to compress the respective discs 30 and 31 against reaction plate 29, thereby effecting clutch engagement. When clutch engagement is so accomplished, it will be noted that a positive drive is completed through drive gear 14 (see FIGURE 1), driven gear 15, sleeve 17 and the clutch discs 30 and 31 of clutch 33 to clutch drum 34 and by virtue of its splined connection to output shaft 13.

Thus, the shaft 13 will revolve and at a lower rate of speed but in accordance with the rotation of drive shaft 10.

The structure in FIGURE 2 to the left of driven gear 15 is identically constructed to that above described and will operate in identical manner, with the clutch compression fingers 36 associated with pressure plate 42 compressing the respective clutch disc pluralities 30 and 31 against reaction plate 28 so that clutch engagement produced by such clutch disc compression will couple the drive gear 11 to driven gear 12, its sleeve 16, clutch spider 24, clutch discs 30 and 31, and through clutch drum 20 to output shaft 13 to which the latter is splined. Accordingly, the inward and outward movement of yoke 46 produces clutch engagement and clutch disengagement, respectively, relative to driven gear 12 and output shaft 13, as desired.

It will be understood that in order for the driven gear 12 to drive the output shaft 13 it will be necessary for clutch 32 to be engaged and, hence, for the yoke 46 to be translated in a direction to the right of the viewer in the top part of FIGURE 2. Again, the end 46' of yoke 46 will be anchored by pin or other means 43 to a part 44 which is fixed with respect to housing 23. Thus, and as will be explained, as attachments 50 and 51 are pivot mountings for the yoke 46, it will be noted that a translation to the right of control rod 52 will produce a translation to the right of pressure plate 42, thereby producing a clutch engagement of clutch 32 through the compression of the respective disc pluralities 30 and 31 as before explained. At the same time, this translation to the right of control rod 52 will urge yoke 39 in a direction to the right so as to produce a definite disengagement of clutch 33 through the withdrawal of compression fingers 36.

This action insures an effective disengagement of the clutch 33.

We have now to see the manner in which the control rod 52 (see FIGURE 2) is so translated from the neutral or central condition as shown in FIGURE 2, to the right (to produce the engagement of clutch 32 and the disengagement of clutch 33) and, alternately, to the left (to produce engagement of clutch 33 and the disengagement of clutch 32).

At this point it is imperative to note that there is supplied an operating lever 53, which is shown in somewhat schematic form when compared to the remainder of the drawings. Operating lever 53, and clutch control arms 54 and 55, are rigidly secured in radial, spaced relationship to control sleeve 56, the latter being journalled within bearing 57 and similarly journalling control shaft 58. It will thus be noted, by virtue of the fixed or rigid attachment of the operating lever 53 and clutch control arms 54 and 55 to control sleeve 56, that the rotational displacement of operating lever 53 will be accompanied by a simultaneous, rotational displacement of the clutch control arms 54 and 55. At this point it will be noted that thrust collars 59 and 60 (see FIGURE 2) are slidably mounted upon control rod 52 for translational movement therealong. Clutch control link members 61 and 62 are pivotally secured to their respective thrust collars 59 and 60 by means of pivot bolts 63 and 64 and, their remaining extremities are secured by additional pivot bolts 65 and 66 to clutch control arms 54 and 55 at points removed from their connection with control sleeve 56. Clutch control link members 61 and 62 are each provided with outwardly and transversely protruding spacer lugs 67 and 68 which offer engagement stops for travel limiting screws 69 and 70. It will be noted that lock nuts 71 and 72 are supplied and that the travel limiting screws 69 and 70 are threaded through the ends of clutch control arms 54 and 55 so that the tips of the screws may be adjustedly disposed to come into the engagement with lugs 67 and 68, thereby preventing each clutch control link member and clutch control arm combination from over-toggling excessively. However, the travel limiting screws 69 and 70 should be adjusted so that there will exist a slight over-toggle beyond infinite leverage points of the linkage for clutch engagement locking purposes.

Nuts 73, 74, 75 and 76 are threaded onto control rod 52, and a compression spring 77 is disposed between nut 74 and the sleeve 78 which transversely receives the control rod 52. See FIGURE 4 in this connection. As shown in FIGURE 4, the bolt attachments 51 are threaded into sleeve 78, and bushings 79 and 80 journal the yoke 46 thereto. Nuts 73 and 74 will be adjusted so that the proper compression of spring 77 will exist. Thus, the adjustment of nuts 73 and 74 will preclude too loose a clutch engagement as in the case where the spring is not compressed sufficiently, and will also prevent excessive loading of the linkage were the springs 77 compressed too much. This of course applies to both ends of the control rod 52 and, of course, to yoke 39. It is to be noted, that the outward thrusting of each of the yoke members 39 and 46 is accomplished by the direct contact of the respective thrust collars 59 and 60 with the respective positioning nuts 76.

Accordingly, when the operating lever 53 is translated to the right of the viewer, that is to the position 53', then the clutch control arm 55 and clutch control link member 62 will be urged downwardly (ultimately to a slight over-toggle position) so as to urge the yoke 39 in an outward direction, thereby disengaging the clutch 33. This action will be accompanied by the translation to the right of control rod 52 which makes up (i.e. causes the engagement of) the clutch 32. It will be noted that the latter action is not interfered with by clutch control link member 61 and its attachment to clutch control arm 54 since the thrust collar 59 will simply slide along control rod 52 to a new position 59'. This sliding action of thrust collar 59' in no way alters or interferes with the translation to the right of control rod 52. At this point it should be mentioned that optimum operation of the mechanism as above described will be achieved when the effective lever arm of members 54 and 61 between the pivots 63, 65 and 58 are approximately equal. The same relationship applies with respect to members 55 and 62.

The operation above described is substantially repeated in connection with the rotational displacement of operating lever 53 to position 53''. In this latter event there will occur a slight over-toggling of clutch arm 54 with respect to clutch control link member 61 until travel limiting screw 69 contacts lug 67. (By "over-toggling" is meant that the clutch control arm 54 and clutch link member 61 come into rectilinear relationship and proceed therebeyond slightly, thereby achieving a locked condition, so that the locked configuration thereof will be very slightly concave upwardly.)

Correspondingly, the clutch control link member 62 and its respective clutch control arm 55 assume an acute angle relationship (similar to the dotted line drawing in connection with the new position 59' of thrust collar 59) so that there will be a sliding to the left of thrust collar 60 along control rod 52. When the effective lever arms of clutch control link member 62 and clutch control arm 55 are in approximately one-to-one relationship, optimum operation is achieved.

It will be understood that in order for the driven gear 12 to drive the output shaft 13 it will be necessary for clutch 32 to be made up (engaged) and, hence, for the yoke 46 to be translated in a direction to the right of the viewer in the top part of FIGURE 2. Since attachments 50 and 51 are pivot mountings for the yoke 46 a translation to the right of control rod 52 will be accompanied by and, in fact, produce a translation to the right of pressure plate 42. This produces an engagement of clutch 32 through the compression of the respective disc pluralities 30 and 31 as before explained. At the same time, translation to the right of control rod 52 will urge yoke 39 to the right so as to produce a definite disengagement of clutch 33 through the withdrawal of compression fingers 36. This action insures an effective disengagement of the clutch 33.

When the operating lever 53 is in its neutral or, as shown, its vertical position, then the clutch control link members 61 and 62 and their respective clutch control arms 54 and 55 assume their widest configuration, as shown, so that the thrust collars 59 and 60 will abut nuts 76 in FIGURE 2. Thus, there will be no slack encountered in neutral condition and the clutches must be disengaged in order for the clutch discs to be disengaged and provide clearance required for neutral operation.

As hereinafter described, it is essential that proper clutch disengagement be assured when the operating lever 53 is in neutral or vertical position so that, when desired, appropriate braking action may be supplied the clutch drum 81 of clutch 33 and the corresponding drum of clutch 33'.

At this juncture it is important to note that there may be supplied adjustable abutments for the respective thrust collars 59 and 60. These may take the form of adjustment nuts 82 and 83 (see FIGURE 1) disposed at opposite extremities, relatively speaking, of control rod 52. Hence, the adjustment nuts 73, 74, 75, and 76 may be used strictly for the purpose of adjusting the tension on and positioning the spring 77, whereas effective engagement of the thrust collars 59 and 60 with abutments of control rod 52 may be provided for and adjusted for by the provision of nuts 82 and 83.

As shown in FIGURE 1 a pair of bearings 57 and 57' journal control sleeve 56 and control shaft 58.

In similar manner to the above, there are welded or otherwise fixedly secured to shaft 58 a pair of clutch control arms 54' and 55', and these in turn are coupled by pivotal connections to their respective clutch control link members 61' and 62'. In contrast with the neutral condition shown in the solid line configuration of FIGURE 2, FIGURE 1 illustrates the left hand side of the power selector mechanism, i.e. that associated with control sleeve 56, to be such that the clutch 33 is disengaged whereas the clutch 32 is engaged. On the right hand side of FIGURE 1 it will be noted that clutch 32' is disengaged whereas clutch 33' is engaged.

In FIGURE 1 is shown a tie rod 84 which is joined at a clevis connection to operating lever 53 by clevis bolt 85 with a pin duly inserted therein. Correspondingly, tie rod 86 is joined at its clevis connection to operating lever 53' by its respective clevis bolt 87 and clevis pin or cotter.

Figure 3:
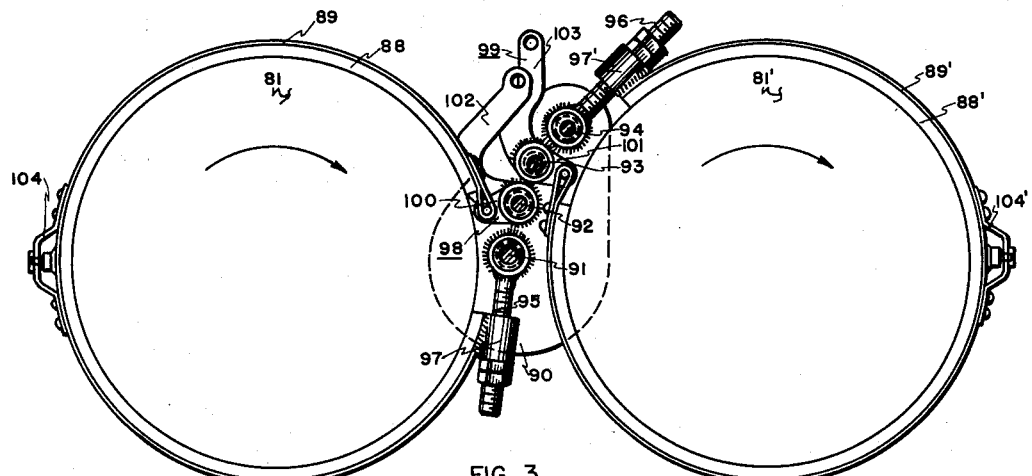
FIGURE 3 is a simplified view taken along 3—3 in FIGURE 1 illustrating the braking means associated with the power selector rear clutch drums.

At this point it would be well to consider the structure associated with the rear clutches 33 and 33'. These clutches, again, include clutch drums 81 and 81', of substantially identical configuration, wherein the latter (81 and 81') also function as brake drums which receive linings 88 and 88' (see FIGURE 3) and also brake bands 89 and 89' which are disposed circumferentially about the clutch drums 81 and 81' in the conventional manner. A pair of plates 90 (one being shown in FIGURE 3 and both being shown in FIGURE 1) are fixed to the housing 23 as by welding, bolt attachments or by other means. Whatever the form of these plates or their attachments they preferably include pivot posts 91, 92, 93 and 94 which span the two spaced plates 90. Sleeved to the posts 91 and 94 are eye bolts 95 and 96 which serve as brake adjustment eye bolts and which are secured to brake bands 89 and 89' by band bosses 97 and 97'. Correspondingly, bell cranks 98 and 99 are sleeved upon posts 92 and 93, with respective work arms 100 and 101 thereof being coupled to the remaining ends of brake bands 89 and 89', and with the respective control arms 102 and 103 thereof being adapted for coupling to external means, hereinafter to be shown. Portions 104 and 104' of the two brake bands 89 and 89' are strictly conventional, being brake band positioning means, and form no part of the present invention. Clevis connector 105 in FIGURE 1 is joined to the work arm 103 and connects the same to brake cable 106 of flexible brake line 107. Correspondingly, clevis connection 108 connects to work arm 102 of FIGURE 3 and intercouples the same with brake cable 109 of flexible brake line 110. Thus, it will be noted that the brake bands 89 and 89' will be self-lockingly set upon the pulling thereof in a common direction by respective brake cables 109 and 106, respectively. Hence, it is now perceived that by virtue of the actuation of brake cables 109 and 106 and clutch tie rods 86 and 84, that all of the clutch mechanism and all of the brake mechanisms of the system may be appropriately actuated.

Before turning to the ultimate control of the brake and clutch mechanisms, heretofore described, it should be noted that in lieu of brake cables 109 and 106 there might also be conveniently provided suitable bell cranks, and linkages as substitutes therefor as are well known to the art.

The continuation of the brake cables 106 and 109 and also tie rods 86 and 84 is shown in FIGURE 5 wherein the same are shown coupled by respective clevises and pivot attachments to work arms 123, 124, 125 and 126. The work arm mounting collars 127, 128, 129 and 130, of the respective work arms, are respectively splined to exteriorly splined sleeves 118, 117, 116 and to shaft 115. Further, it will be noted that left brake shifting lever follower 120, left clutch shifting lever follower 131, right clutch shifting lever follower 190, and right brake shifting lever follower 119 are respectively affixed by welding or other means to shaft 115, and sleeves 116, 117, and 118 respectively. It will be noted, therefore, with reference to FIGURE 5 that left brake shifting lever follower 120, shaft 115, collar 130 and work arm 126 in fact constitute a bell crank which is designated 111. Correspondingly, left clutch shifting lever follower 131, sleeve 116, collar 129 and work arm 125 constitute a second bell crank termed 112. Similarly, right clutch shifting lever follower 190, sleeve 117, collar 128 and work arm 124 constitute a third bell crank 113. And finally, right brake shifting lever follower 119, sleeve 118, collar 127 and work arm 123 constitute a final and fourth bell crank 114. Thus, it will be noted that the bell cranks are concentrically journalled about shaft 115 of the first bell crank 111 so that the rotational displacements of members 120, 131, 190, and 119 will be accompanied by the respective rotational displacements of work arms 126, 125, 124 and 123, respectively. Such displacements in turn produce a translation of the cables and tie rods 106, 86, 84, and 109 coupled thereto so as to produce actuation of the brake bands 89 and 89' in FIGURE 3 and rotation of the clutch control shaft and sleeve 58 and 56.

Referring to the structure of FIGURE 5, frame 132 is fixedly disposed with respect to the vehicle incorporating same and includes a self-aligning carrier bearing 133 for carrying the shaft 115, the same being maintained in position by attachments 134. It is thus seen that the frame 132 will journal the concentric shaft and sleeve construction, not only at bearing 133 but also by virtue of the inclusion of an additional journal bearing 135 which may or may not constitute a part of frame 132. Normally, however, sleeve 118 will be journalled by a split journal 136 associated with frame 132 and a removable cap held by cap screws 136'. Sleeves 116, 117 and 118 will extend beyond such journal to be disposed within a remotely disposed journal 135 in close proximity to and to support the work arms as before mentioned. See also FIGURE 7. Thus, since the shaft 115 and sleeves 116, 117 and 118 may be any desired length, selection of any operator position, even remote from the power selector, can be accommodated.

The opposite sides 137 and 138 of frame 132 are each serrated at a corresponding upper region 139 (see FIGURES 6 and 7) thereof by a plurality of pawl engagement teeth 140. The frame 132 is completed by the securement of support members 141 and 142 to sides 137 and 138 as by welding or by other means. Journalling ring 143, journalled upon shaft 113 (see FIGURES 5, 7 and 10), is relieved at area 144 in FIGURE 10 and accommodates cap screws 145 and 146 which are used to enable the pivotal connection thereto of pivot ring 147, the latter integral with the shifting lever 148. Journal bearings 149 and washers 150 can also be used. It is to be noted that some annular space exists between journalling ring 143 and pivot ring 147. This is to enable the pivotal displacement, forward and backward, of shifting lever 148 so that displacement (in the plane of the drawing of FIGURE 5) may be accomplished. However, it will be noted that the shifting lever 148 may also be pivoted about shaft 115 in a direction in the plane of the paper with reference to FIGURE 10 (i.e. transversely to the plane of the paper with reference to FIGURE 5). Such displacement, as has been mentioned immediately previously, however, in no way affects directly the rotation of the shaft 115 and sleeves 116–118 so far as journalling ring 143 is concerned. Rather, it is the displacement of the members 120, 131, 190 and 119 which accomplish the selective rotational displacement of shaft 115 and sleeves 116, 117, and 118 to perform their intended functions.

Figures 9, 10, 11:
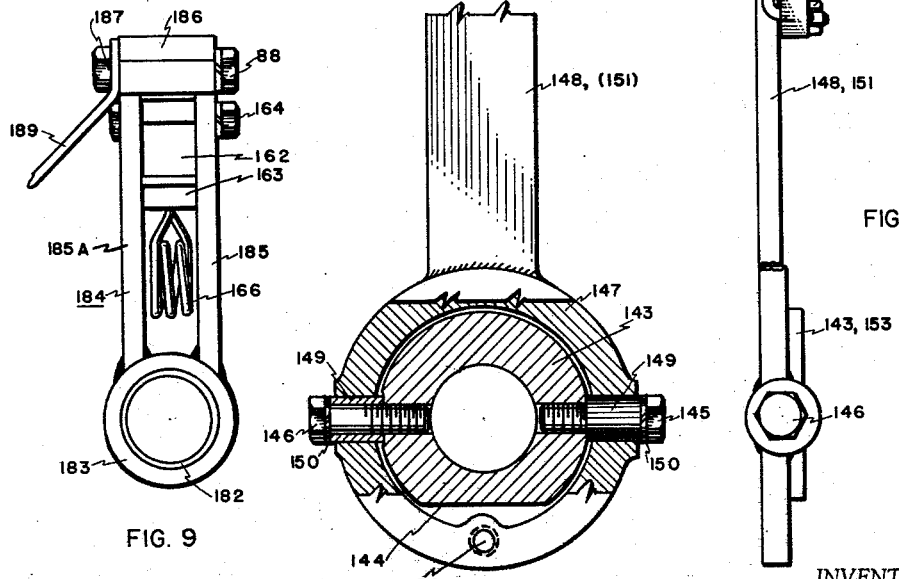
FIGURE 9 is a simplified view, shown in reduced scale, and taken along the line 9—9 in FIGURE 5.
FIGURE 10 is a fragmentary view, partially in section, taken along the line 10—10 in FIGURE 5.
FIGURE 11 is an elevation of a representative one of the shifting levers employed in the present invention.

In a corresponding manner (see FIGURE 5) a shifting lever 151 is supplied and is provided with a pivot ring 152 which is secured to journalling ring 153 in a manner identical to that shown in FIGURE 10 with reference to members 143 and 147. Journalling ring 153 is journalled for revolvement about sleeve 117. The lower extremities of pivot ring 147 and pivot ring 152 are provided with respective threaded apertures 154 which accommodate adjustment screws 157, lock nuts 156, and spring end retainers 158. Accordingly, lock nuts 156 might be loosened and the adjustment screws 157 turned down so as to position spring end retainers inwardly to increase the thrust of compression spring 159. Both extremities of the two pivot rings 147 and 152 are similarly equipped so that the outward thrusting of spring 159 thereagainst may be made adjustable. The purpose of spring 159, which is a relatively heavy spring having a large spring constant, is for the purpose of urging the upper extremities of shifting levers 148 and 151 inwardly. Since this occurs, the inner protuberances 160 and 161 will engage catch members 162 and 163 so as to urge these inwardly about their fixed pivot posts 164 and 165, the latter of which are provided and which mount the catch members 162 and 163 to frame 184. Spring 166 is provided and connects to catch members 162 and 163 at recess apertures 167 and 168.

It will be noted that the right and left clutch shifting lever followers 131 and 190 include apertures 169 and 170 which are sufficiently wide, and only sufficiently wide, to admit the toes of catch members 162 and 163 when said shifting lever followers are in neutral or vertical position. This is important since, when the shifting levers 148 and 151 are urged outwardly so that brake engagement may be accomplished, the members 131 and 190 will remain in a locked, central position to insure that no clutch engagement whatever will take place. Hence, the brakes may be applied without fear that any of the clutches of the system are engaged. As to members 120, 131, 190, and 119, it will be noted that the upper portions thereof are channel-configured, see FIGURES 5 and 7, with seat-type surfaces S and S' being provided. It will be noted that the surfaces S' are chamfered or angulated outwardly so that the angular and outward disposition of levers 148 and 151 may be accommodated when they are urged outwardly for brake engagement. (This brake engagement is about to be discussed.) It will be noted that once the brakes are disengaged and the levers 148 and 151 brought to a vertical position that spring 159 will overcome the outward force of the small, tension spring 166 intercouplining the catch members 162 and 163 so as to urge the shifting levers 148 and 151 inwardly in the absence of outward manual (or operator) force thereupon when the same are in a vertical condition.

For clutch engagement spring 159 tends to urge the shifting levers 148 and 151 inwardly at their upper extremities so that they will engage the seats S of members 131 and 190. The back and forth movement, in and out of the plane of the paper relative to FIGURE 5, of the shifting levers 148 and 151 will accomplish a rotational displacement of members 131 and 190 about the axis of shaft 115. This in turn produces a rotation of the bell cranks 112 and 113 so as, in turn, to produce a rotational displacement of work arms 124 and 125, movement of tie-rods 86 and 84 and, ultimately, rotational displacement of levers 53 and 53' in FIGURE 1; as before explained, the rotations of these levers 53 and 53' produce corresponding rotational displacement in control sleeve 56 and control shaft 58 so as to translate in an axial direction the control rods 52 and 52' (the latter of which is identical to the control rod 52 for the "prime" half of the system).

So far as the movement of the left and right clutch shifting lever followers 131 and 190 is concerned, the inner surfaces thereof will abut the toes of catch members 162 and 163 so that these will be held inwardly for all rotational displacements of the former as is accomplished by the forward and backward movement (in and out of the plane of the FIGURE 5 drawing) of shifting levers 148 and 151.

Figure 7:
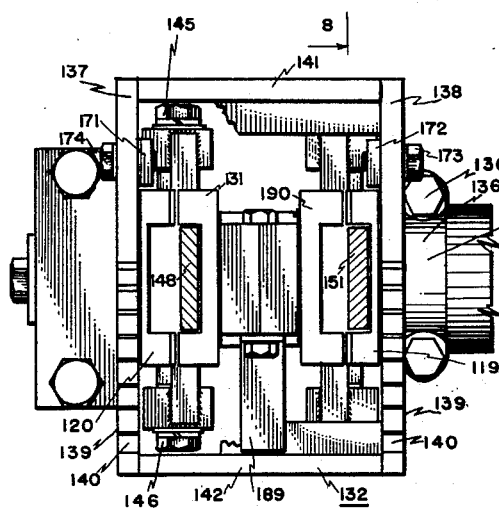
FIGURE 7 is a top plan view, reduced in scale, of the central portion of the structure shown in FIGURE 5.
Figure 8:
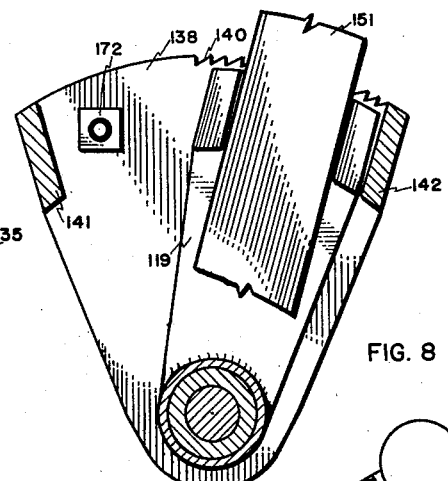
FIGURE 8 is a view partially in section and taken along the line 8—8 in FIGURE 7 and is reduced in scale.

As to the braking action of the system it will be noted that the levers 148 and 151 must be urged outwardly, manually, so as to engage the members 120 and 119. FIGURE 7 illustrates stops 171 and 172 which are secured in place by adjustment bolts 173 and 174. An elongated aperture 175 is provided in each of the sides 137 and 138 of frame 132 (see FIGURE 6) so that the stops may be adjusted appropriately, in order that the conventional spring loading (not shown) of the brake bands 89 and 89' will urge shifting levers 148 and 151 against stops 171 and 172 for desired central positions of the shifting levers 148 and 151. In any event it will be noted that the members 119 and 120 can only be moved in one direction but not in the remaining direction, due to the abutment of stops 171 and 172 with members 119 and 120 at a central position of levers 148 and 151. The brake bands 89 and 89' will, of course, be spring loaded to open position, as before mentioned, as is conventional, and the stops 171 and 172 may be adjusted in their positions, in relation to the adjustable central positions of members 119 to 120 in order to accommodate the same. Thus, when the shifting levers 148 and 151 are disposed outwardly (as is shown in connection with lever 151 in FIGURE 7), then these levers will be pulled rearwardly (i.e. toward the bottom of the page of the drawing) so as to set the brakes. In this connection it will be noted that for brake locking purposes there may be provided a pawl 176 which is secured by screw 177 to each of the shifting levers 148 and 151, which pawl can be actuated by tie-rod 178 pivotally connected thereto by pin 179 and which leads upwardly to actuating handle 180, the latter being pivotally connected to the shifting levers 148 and 151 by pivot pin 181. Thus, an upward movement upon handle 180 will elevate the tie-rod 178 so as to urge the work end of pawl 176 downwardly into engagement with one of the teeth 140. An identical construction will be found in connection with shifting levers 148 and 151, and both sides 138 and 137 of frame 132.

To complete the structure it will be noted that there is provided a bronze or other type bushing 182 which is disposed upon sleeve 116, and pressed upon bronze bushing 182 is a journaling ring 183 which is welded to risers 185 and 185A of subassembly frame 184. The risers 185A and 185 are welded to the crown 186 of the structure and the latter is provided with attachments 187 and 188 for securement to brace 189 which is, in turn, bolted to the frame 132 or otherwise affixed thereto or to other stationary structure. Pivot posts 164 and 165 may comprise bolt attachments as shown in FIGURE 9.

Referring to FIGURE 6, we note that a clockwise movement of the shifting levers 148, 151 will produce a setting of the brakes by the pulling of brake cables 109 and 106 in FIGURE 1. The brakes may be locked appropriately by the actuation of handle 180 of each shifting lever 148, 151 as before explained.

It will be noted, in conclusion, that any one of several driving conditions are possible with the system as hereinbefore described. The complete system when not operated will generally be completely in neutral position, because of the outward pressure of spring 159 and the disposition of shifting levers 148 and 151 in engagement with members 131 and 190. This produces a simultaneous clutch engagement of both halves of the structure as shown in FIGURE 1 so that, preferably, gear ratios of the same speed are selected for both halves of the system. A reverse movement of the levers 148 and 151 (toward the viewer in FIGURE 5) will produce a simultaneous clutch engagement for both output drives 13 and 13' and selection of another speed for the vehicle being driven. When it is desired that one output shaft (e.g. 13) be driven at a different rate from the remaining output shaft 13' then one of the shifting levers 148, 151 will be urged forwardly against its clutch shifting lever follower whereas the other lever will be shifted rearwardly against its clutch shifting lever follower 131, 132. When a brake on one track is to be set and the other track is to be driven, then the mechanism provides a pivot control therefor, while one side is driven, the intended brake's associated shifting lever will be disposed in neutral position and urged outwardly to engage, for example, the right brake shifting lever follower 119 and, thereupon, will be urged rearwardly (in a direction to the right relative to FIGURE 6) so that the brake will be set. It will be noted that this may be accompanied either by the simultaneous setting of the remaining shifting lever 148, for example, or the lever 148 may be used independently, as in said pivot control to set this remaining half of the system in one of the two clutch-engaged positions, or, alternately, even in neutral condition, as desired.

Thus, all types of desired control for the power selector of a track laying vehicle, including pivot control, are made possible by the present invention.

In the present invention one type of power selector as disclosed in the inventor's copending United States patent applications, Serial Numbers 784,240 and 121,670 before referenced, has been discussed. Among these types of power selectors which may be used are variations thereof shown in said applications and also in a subsequent application entitled "Clutch and Brake System for Track Laying Vehicle Transmission" and concurrently filed herewith by the inventor. All of these applications are incorporated herein by way of reference and are made a part of the disclosure hereof for those interested in any information as to further details.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:
1. A transmission including, in combination: a housing; an input shaft journaled within said housing and extending outwardly of one side thereof for coupling to a power source; an output shaft journaled within and extending through said housing on the opposite sides thereof; a pair of drive gear means fixed to said input shaft within said housing; a pair of driven gear means of differing speed ratios disposed in mesh with said drive gear means and also within said housing and revolvably journaled upon said output shaft; a pair of concentric end to end disposed sleeve means journaling said output shaft, said sleeve means being respectively integral with said driven gear means, being journaled within said housing, and extending outwardly therefrom on opposite sides thereof and terminating short of the respective extremities of said output shaft; a pair of clutch means respectively secured to and between said output shaft and the respective sleeve means for selectively coupling rotational energy of a selected one of said sleeve means to said output shaft, said clutch means being disposed on opposite sides of said housing and exteriorly thereof; a control rod affixed to and interconnecting said clutch means; bearing means fixedly disposed with respect to said housing; a lever means having a portion journaled in said bearing means; first and second control arms radially extending from said journaled portion of said lever means; first and second collars slidably disposed on said control rod at opposite ends thereof; first and second link members respectively pivotally coupled to said first and second control levers and to said first and second collars, said control rod having a pair of abutments engageable by said collars, respectively, for effecting desired clutch engagement, the control arms with their respective link members comprising locking means in which the associated control arms and link members will over-toggle with respect to their pivot connection to effect a locking of the selected clutch means; means for varying the degree of over-toggle; and means for adjusting the frictional engagement of the output shaft and sleeve means portions of the clutch means.

2. The structure of claim 1, wherein one of said clutches includes a clutch drum; and wherein the transmission includes braking means proximate said clutch drum for selectively frictionally braking said clutch drum, control means comprising plural, concentrically journaled bell cranks individually provided with work arms, a first linkage means intercoupling said lever means with a respective one of said bell cranks at its work arm, a second linkage means intercoupling said braking means with the other of said bell cranks at its work arm, and a single shifting lever means adapted to selectively rotate the said bell cranks, thereby actuating either one or the other of the clutch means, or the brake means, or providing a neutral position.

3. The structure of claim 2, wherein said bell cranks include individual, shifting-lever-receiving follower means; and wherein the shifting lever means includes a shifting lever that is disposed between said follower means and is selectively engageable with said shifting lever follower means to actuate said bell cranks.

4. Structure according to claim 3, wherein the shifting lever is provided with selectively actuatable brake set means.

5. A transmission including: a housing; an input shaft journaled within said housing and extending outwardly of one side thereof for coupling to a power source; a pair of output shafts journaled within and extending through said housing on the opposite side thereof; a pair of drive gear means fixed to said input shaft within said housing; a pair of driven gear means of differing speed ratios disposed in mesh with said drive gear means and surrounding each of said output shafts; a pair of concentric, end to end disposed sleeve means journaled about each of the output shafts and respectively integral with said driven gear means; a pair of clutch means for each output shaft, said respective pairs of clutch means serving to interconnect the sleeve means and the output shaft for unitary rotation, the speed of which is dependent upon the sleeve and integral driven gear means that is coupled to the clutch means; a control rod interconnecting the clutch means of each output shaft; bearing means fixedly disposed with respect to said housing; a pair of lever means each having a portion journaled in said bearing means; first and second control arms radially extending from said journaled portion of each of the lever means; first and second collars slidably disposed on each of said control rods at opposite ends thereon; link members, pivotally coupled to each of the first and second control arms and to said first and second collars, each of said control rods having a pair of abutments engageable by said collars, respectively, for effecting desired clutch engagement; a clutch drum fixed to one clutch of each output shaft; braking means proximate each of said clutch drums for selectively frictionally braking said clutch drums; control means comprising plural, concentrically journaled bell cranks individually provided with work arms; first and second linkage means respectively intercoupling the lever means with separate bell cranks at their work arms; third and fourth linkage means, respectively intercoupling each of the braking means with other bell cranks at their work arms; a pair of shifting levers, each of said shifting levers being engageable with one of the lever means connected to their pair of clutches for one output shaft and with the braking means associated with one of said pair of clutch means; and means normally biasing said shifting levers into engagement with its associated lever means and out of engagement with its associated braking means.

6. In combination, a pair of drums proximately disposed with respect to each other in a common plane, means coupled to said drums for rotating said drums in a common direction, a pair of brake band means circumferentially disposed about said drums, respectively, stationary mounting means fixedly disposed with respect to the axes of revolvement of said drums and disposed between said drums, a pair of means affixed to said mounting means and connecting to one extremity of each of said brake band means, respectively, for anchoring the latter, pivot means affixed to said mounting means and disposed between said pair of means, and a pair of bell cranks respectively journaled upon said pivot means and having individual control arms and work arms, the remaining extremities of said brake band means being affixed to said bell crank work arms, said bell cranks being so constructed and arranged that said brake band means will be tightened about said drums in a self-locking direction with respect to the rotation of said drums when similarly directed forces are applied to said bell crank control arms.

References Cited in the file of this patent

UNITED STATES PATENTS

| | | |
|---|---|---|
| 862,534 | Bell | Aug. 6, 1907 |
| 982,856 | Parker | Jan. 31, 1911 |
| 1,387,892 | Kroyer | Aug. 16, 1921 |
| 2,147,694 | Fawick | Feb. 21, 1939 |
| 2,870,643 | Leliter | Jan. 27, 1959 |
| 2,983,348 | Ott | May 9, 1961 |
| 3,044,318 | Hardman | July 17, 1962 |

FOREIGN PATENTS

| | | |
|---|---|---|
| 920,419 | France | Jan. 4, 1947 |